(12) United States Patent
Elko et al.

(10) Patent No.: US 6,230,243 B1
(45) Date of Patent: May 8, 2001

(54) METHOD, SYSTEM AND PROGRAM PRODUCTS FOR MANAGING CHANGED DATA OF CASTOUT CLASSES (75) Inventors: David Arlen Elko, Austin, TX (US); Jeffrey W. Josten, San Jose, CA (US); Jeffrey M. Nick, Fishkill, NY (US); David H. Surman, Milton, NY (US); Wendell W. Wilkinson, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/251,888

(22) Filed: Feb. 19, 1999

(51) Int. Cl.⁷ .................................................. G06F 12/00
(52) U.S. Cl. ............................ 711/130; 711/118; 711/154
(58) Field of Search .................................... 711/113, 130, 711/118, 154

(56) References Cited

U.S. PATENT DOCUMENTS

| | | | |
|---|---|---|---|
| 5,287,473 | 2/1994 | Mohan et al. ...................... | 711/133 |
| 5,317,739 | 5/1994 | Elko et al. ........................... | 709/216 |
| 5,457,793 | 10/1995 | Elko et al. ........................... | 707/205 |
| 5,493,668 | 2/1996 | Elko et al. ........................... | 711/130 |
| 5,537,574 | 7/1996 | Elko et al. ........................... | 711/141 |
| 5,561,809 | 10/1996 | Elko et al. ........................... | 709/213 |
| 5,706,432 | 1/1998 | Elko et al. ........................... | 709/213 |
| 5,751,992 | * 5/1998 | Bhargava et al. .................... | 711/130 |
| 5,813,032 | * 9/1998 | Bhargava et al. .................... | 711/130 |

* cited by examiner

Primary Examiner—Paul V. Kulik
(74) Attorney, Agent, or Firm—William A. Kinnaman, Jr., Esq.; Heslin & Rothenberg, P.C.

(57) ABSTRACT

Changed data of castout classes of a coupling facility cache are managed in order to be able to efficiently determine the age of the oldest changed data in the cache. A directory entry representing a changed datum is placed in a data structure corresponding to the castout class of the changed datum. The data structure includes an order queue ordered by timestamps and a process queue, having an ordered portion and an unordered portion. When the directory entry is to be added to the data structure, an attempt is first made to place the entry on the order queue. If the entry is not placed on the order queue within a predefined amount of time, then the entry is placed on the process queue, the order of which is maintained by background tasks. In order to return the oldest entry of the data structure, the smallest entry of the process queue is determined and that entry is then compared to the smallest entry of the order queue. The smaller of those two entries corresponds to the oldest entry for the castout class.

43 Claims, 6 Drawing Sheets fig. 1 fig. 3 fig. 4 fig. 5 fig. 6

METHOD, SYSTEM AND PROGRAM PRODUCTS FOR MANAGING CHANGED DATA OF CASTOUT CLASSES

TECHNICAL FIELD

This invention relates, in general, to the managing of changed data stored in a coupling facility cache structure, and in particular, to efficiently identifying the oldest changed data within castout classes of the cache structure.

BACKGROUND ART

A cache structure is a high-speed cache shared by one or more independently-operating computing units of a computing environment. In particular, cache structures are located within a remote facility, referred to as a coupling facility, that is coupled to the one or more independently-operating computing units. The computing units store and retrieve data from the cache structures.

Coupling facility cache structures can be configured in several different modes of operation, one of which is a store-in mode. Store-in mode caches are used, for example, by the DB2 database management facility of International Business Machines Corporation. A key attribute of the store-in mode is that changed data may be stored into the non-volatile memory of the coupling facility using the high performance coupling facility links. This avoids the delay in the execution of database transactions that result when the data is written to secondary storage (e.g., direct access storage devices (DASD)) using normal input/output (I/O) operations, and is an advantage of the coupling facility cache.

The store-in mode requires, however, that the database program provide background tasks, called castout processes, to periodically write the changed data, using batched I/O operations to the database locations on DASD. In order to enhance the performance of the I/O operations, the changed data are grouped by physical DASD volume into castout classes.

The castout processes provide two key functions: First, they ensure that the cache does not become full of changed data, and thus, keeps the percentage of changed versus unchanged data in the cache at or below certain thresholds. Second, the castout processes ensure that the amount of time a database page can reside in the cache in the changed state is bounded by some predetermined value. This bound is critical in those cases in which the coupling facility fails and database logs are needed to recover the lost data. The bounding of the amount of time a page can remain changed in the cache, bounds how far back in time the logs must be processed, and thus, bounds the amount of time needed to perform the recovery operation. Bounding this recovery time is critical in meeting the availability goals of the database.

In order to satisfy the bounds, it is important for the castout processes to be able to efficiently determine the age of the oldest changed page in the cache. This determination cannot be based solely on the arrival pattern of the requests, since the timestamps associated with the transactions and stored in the database log do not correspond to the arrival of the data at the coupling facility. They occur at different times. Also, the coupling facility services numerous coupling facility links in parallel, and so the sequence at which requests arrive at the facility does not correspond to the sequence in which they are executed. Thus, more information is required. This additional information is provided in an object associated with each changed page written to the coupling facility, called the user data field (UDF). The UDF object contains the timestamp that the database associates with the changed page. The UDF object is stored in a directory entry associated with the changed page and can be retrieved by issuing a read directory command.

Conventionally, the castout processes determine the oldest timestamp value in the directory by scanning the entire directory each time a castout process executes. This requires issuing numerous read directory commands to retrieve all of the UDF values in the cache, so that the oldest changed page can be identified. Since, the directory for a large cache may contain several million directory entries, significant overhead is realized in the coupling facility when the directory scan is executed. Further, a castout process needs to execute every few minutes, and thus, the overhead is exacerbated. It has even been necessary to purchase additional central processing unit (CPU) engines for the coupling facility to satisfy the scan.

Based on the foregoing, a need exists for a capability that enables the efficient determination of the age of the oldest changed page in a cache structure without requiring the need to scan the entire cache directory. A further need exists for a capability that manages changed data in a cache structure in a manner that does not degrade system performance. A yet further need exists for a capability that manages the changed data in a manner that enhances castout processing.

SUMMARY OF THE INVENTION

The shortcomings of the prior art are overcome and additional advantages are provided through the provision of a method of managing changed data of castout classes. In one embodiment, the method includes attempting to place, within a predefined amount of time, an entry for a changed datum in a first data structure associated with a castout class. The method further includes placing the entry in a second data structure associated with the castout class, when the predefined amount of time to place the entry in the first data structure elapses.

In one example, the attempting to place the entry in the first data structure includes determining whether a timestamp of the entry is larger than the timestamp located at one end of the first data structure; determining, when the timstamp is not larger, whether the timestamp of the entry is smaller than a timestamp located at another end of the first data structure; and searching the first data structure for the predefined amount of time, when the timestamp of the entry is not larger than the timestamp at the one end or smaller than the timestamp at the other end, for a proper location to place the entry.

In a further example, the placing of the entry on the second data structure includes inserting the entry at one end of a first portion of the second data structure, when a timestamp of the entry is smaller than a timestamp located at the one end; inserting the entry at another end of the first portion of the second data structure, when the timestamp of the entry is larger than a timestamp located at the another end; and inserting the entry in a second portion of the second data structure, when the entry is not inserted at the one end or the another end.

In a further embodiment of the present invention, the method includes determining which entry of the first data structure or the second data structure represents an oldest changed datum of the castout class.

In yet a further embodiment of the invention, at least a portion of the second data structure is unordered, and the method includes ordering, using at least one background task, the at least a portion of the second data structure.

In another aspect of the present invention, a system of managing changed data of castout classes is provided. The system includes, for instance, means for attempting to place, within a predefined amount of time, an entry for a changed datum in a first data structure associated with the castout class; and means for placing the entry in a second data structure associated with the castout class, when the predefined amount of time to place the entry in the first data structure elapses.

In yet a further aspect of the present invention, a system of managing changed data of castout classes is provided. The system includes, for example, a processor adapted to attempt to place, within a predefined amount of time, an entry for a changed datum in a first data structure associated with a castout class. The processor is further adapted to place the entry in a second data structure associated with the castout class, when the predefined amount of time to place the entry in the first data structure elapses.

In yet a further aspect of the present invention, an article of manufacture including at least one computer usable medium having computer readable program code means embodied therein for causing the managing of changed data of castout classes is provided. The computer readable program code means in the article of manufacture includes, for instance, computer readable program code means for causing a computer to attempt to place, within a predefined amount of time, an entry for a changed datum in a first data structure associated with a castout class; and computer readable program code means for causing a computer to place the entry in a second data structure associated with the castout class, when the predefined amount of time to place the entry in the first data structure elapses.

The present invention advantageously provides a capability for determining the oldest cached data in a castout class without requiring a directory scan of all directory entries of the coupling facility. The directory scan is replaced by a pair of UDF queues for each castout class, which are efficiently managed in order to be able to determine the age of the oldest cached data of a castout class quickly and efficiently.

The oldest UDF value for a castout class is returned as part of the castout processing. In particular, the oldest value is returned in the castout class header when the castout process reads the header information for the castout class. Thus, the scan of millions of directory entries is replaced by reading a much smaller number of castout class headers. Further, since the reading of the castout class headers is part of the normal castout processing, no additional commands need be sent to the coupling facility. This solves the capacity problem associated with the directory scan and significantly speeds the castout process by eliminating a significant number of command executions associated with the scan.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with the principles of the present invention, changed data stored within cache structures of a coupling facility are managed in order to enhance castout processing associated with the changed data. The changed data are partitioned into castout classes, and each castout class has associated therewith a pair of data structures used to store directory entries associated with the changed data. The directory entries are inserted into the data structures in a manner that enables efficient determination of the age of the oldest changed data of a castout class.

Figure 1:
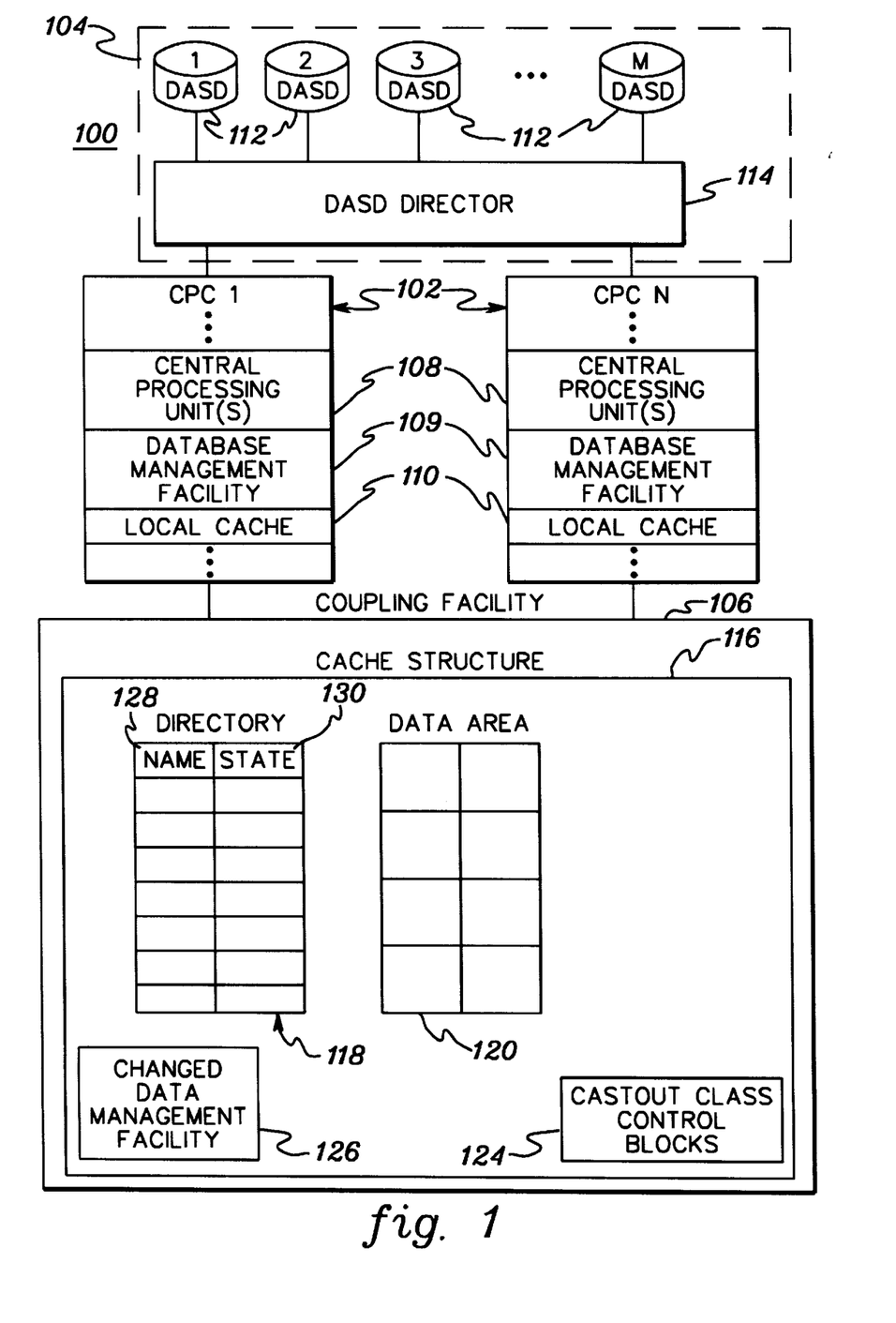
FIG. 1 depicts one example of a computing environment incorporating and using the management capability of the present invention.

One embodiment of a computing environment incorporating and using the management capability of the present invention is depicted in FIG. 1. Computing environment 100 is based, for instance, on the Enterprise Systems Architecture (ESA)/390 offered by International Business Machines Corporation. ESA/390 is described in an IBM publication entitled Enterprise Systems Architecture/390 Principles of Operation, IBM Publication No. SA22-7201-04, June 1997, which is hereby incorporated herein by reference in its entirety. One example of a computing environment based on ESA/390 is the ES/9000 Model 900 computing system offered by International Business Machines Corporation, Armonk, N.Y.

Computing environment 100 includes, for instance, one or more central processing complexes (CPCS) 102, a secondary storage unit 104 and at least one coupling facility 106.

Each central processing complex includes, for example, at least one central processing unit (CPU) 108, at least one database management facility 109, and at least one local cache 110. Each central processing unit executes an operating system, such as the Multiple Virtual Storage (MVS) or OS/390 operating system offered by International Business Machines Corporation, which is used for controlling execution of programs and the processing of data, as is well known.

Each database management facility 109 owns and controls a set of resources within the computer system. As one example, the database management facility is DB2, offered by International Business Machines Corporation.

Local caches 110 include data associated with its respective central processing complex. In particular, each local cache includes a name field for referencing data; a data field for storing the data; an optional adjunct data field for additional data; and a state field for indicating whether or not the data in the data field is valid.

Coupled to the central processing complexes, is secondary storage unit 104. In one example, the secondary storage includes one or more direct access storage devices (DASD) 112, and a DASD director 114 coupled thereto. DASD director 114 controls access to the direct access storage devices. The DASD director couples the secondary storage unit to the central processing complexes via one or more channels (e.g., ESCON channels).

Each central processing complex 102 is also coupled to coupling facility 106 (a.k.a., a structured external storage (SES) processor). Coupling facility 106 contains storage accessible by the central processing complexes and performs operations requested by programs in the CPCs. Aspects of the operation of a coupling facility are described in detail in such references as Elko et al., U.S. Pat. No. 5,317,739, entitled "Method and Apparatus For Coupling Data Processing Systems", issued May 31, 1994; Elko et al., U.S. Pat. No. 5,561,809, entitled "In A Multiprocessing System Having A Coupling Facility, Communicating Messages Between The Processors And The Coupling Facility In Either A Synchronous Operation Or An Asynchronous Operation", issued on Oct. 1, 1996; Elko et al., U.S. Pat. No. 5,706,432, entitled "Mechanism For Receiving Messages At A Coupling Facility", issued Jan. 6, 1998; and the patents and applications referred to therein, all of which are hereby incorporated herein by reference in their entirety.

Coupling facility 106 includes, for instance, one or more storage structures, such as a cache structure 116. Each cache structure includes, for instance, a directory 118; a data area 120; castout class control blocks 124; and a changed data management facility 126, which includes at least a portion of the logic used for the present invention. The cache structure and/or the coupling facility include other or additional components or information, which need not be discussed for the present invention.

Cache directory 118 is a collection of directory entries partitioned into storage classes and arranged as a fully associative array. The subset of changed directory entries is additionally partitioned into castout classes. Each directory entry includes, for instance, a name field 128 and a state field 130. Whenever a named data object is placed in coupling facility cache 116 or local cache 110, its name is registered in name column 128 and its state is registered in state column 130 by the cache directory. The state information indicates, for example, its location in the local cache, whether the data is changed, unchanged, locked for castout or resident in the coupling facility. The state also includes a user data field (UDF), which contains a value that is associated with the data when it is initially changed in the coupling facility cache and is maintained until the data area is reused. The user data field is valid when the data is cached as changed. The user data field contains a time value or timestamp, which represents the oldest point in time when the data element was changed and that change has not yet been migrated to DASD.

Data area 120 is the area in the cache in which the user data is stored. A data object cached in the shared cache is identified by a software-assigned name. Therefore, any request for reading or writing data in the shared cache specifies the name of the data object, which is the object of the request. The directory is conventionally indexed by the names of the data objects, which are objects of the read or write commands.

Castout class control blocks 124 include a castout class control block for each castout class associated with the cache structure. In accordance with the principles of the present invention, each castout class control block has pointers to a data structure of directory entries corresponding to the changed data elements of that castout class. In one example, the data structure is implemented as a pair of data structures, but has an architected view as a single data structure.

Figures 2A, 2B:
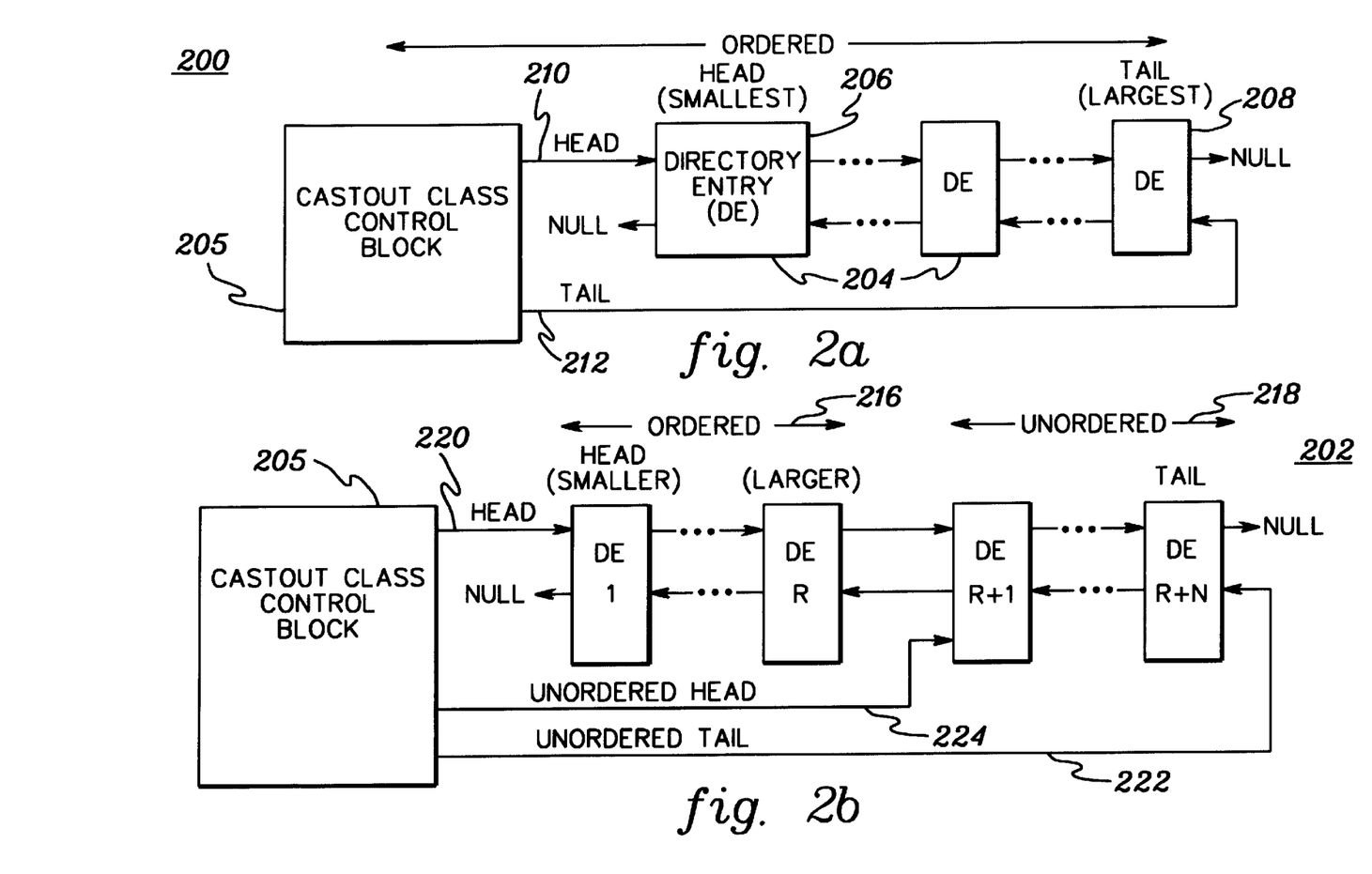
FIG. 2a depicts one example of an ordered data structure implemented in accordance with the principles of the present invention.
FIG. 2b depicts one implementation of a data structure having an ordered portion and an unordered portion, in accordance with the principles of the present invention.

One implementation of the data structure of the present invention is illustrated in FIGS. 2a–2b. As one example, the data structure includes a pair of queues, referred to as UDF queues. One of the UDF queues is an UDF order queue 200 (FIG. 2a), which includes entries ordered by the UDF timestamps, and the other queue is an UDF process queue 202 (FIG. 2b), which may be partially ordered, as described below.

Referring to FIG. 2a, UDF order queue 200 includes a plurality of directory entries 204 corresponding to changed data of the castout class associated with a castout class control block 205. The directory entries are maintained in ascending UDF order from head to tail. For example, in the UDF order queue, the oldest (smallest) entry 206 is at the head of the queue and the newest (largest) entry 208 is at the tail. Various pointers for the UDF order queue are stored in castout class control block 205. In particular, the control block includes a head pointer 210 used to indicate the head of the queue and a tail pointer 212 used to indicate the tail of the queue.

Referring to FIG. 2b, UDF process queue 202 includes any directory entry of the castout class that is not placed on UDF order queue 200 within a predefined amount of time (e.g., after searching through X number of entries (where X=100–200, as one example)). Thus, UDF process queue 202 may have zero entries, if all the entries are properly placed on the order queue within the predefined amount of time.

UDF process queue 202 includes two portions: an ordered portion 216 and an unordered portion 218. Ordered portion 216 includes one or more directory entries placed on the UDF process queue in UDF (i.e., timestamp) order. For example, in FIG. 2b, directory entries 1 to R are in timestamp order. Unordered portion 218 includes any entries that are to be placed on the UDF process queue, but have failed to be placed in the ordered portion of the process queue within an acceptable amount of searching steps or time. In FIG. 2b, directory entries R+1 to R+N are unordered.

Various pointers for UDF process queue 202 are stored within castout class control block 205. For example, the control block includes a head pointer 220 used to indicate the head of the ordered portion of the queue, a tail pointer 222 used to indicate the tail of the unordered portion of the queue, and an unordered head pointer 224 used to indicate the beginning of the unordered portion of the UDF process queue.

As described above, the UDF order queue and the UDF process queue are used together to manage the directory entries of cached data of a castout class. Further details regarding the interplay between the UDF order queue and the UDF process queue are described in detail with reference to FIGS. 3–4. The logic of these figures is implemented by, for instance, changed data management facility 126, which is invoked by commands of database management facility 109.

One example of the logic used to attempt to place a directory entry of a cached datum of a particular castout class on UDF order queue 200 is described with reference to FIG. 3.

Figure 3:
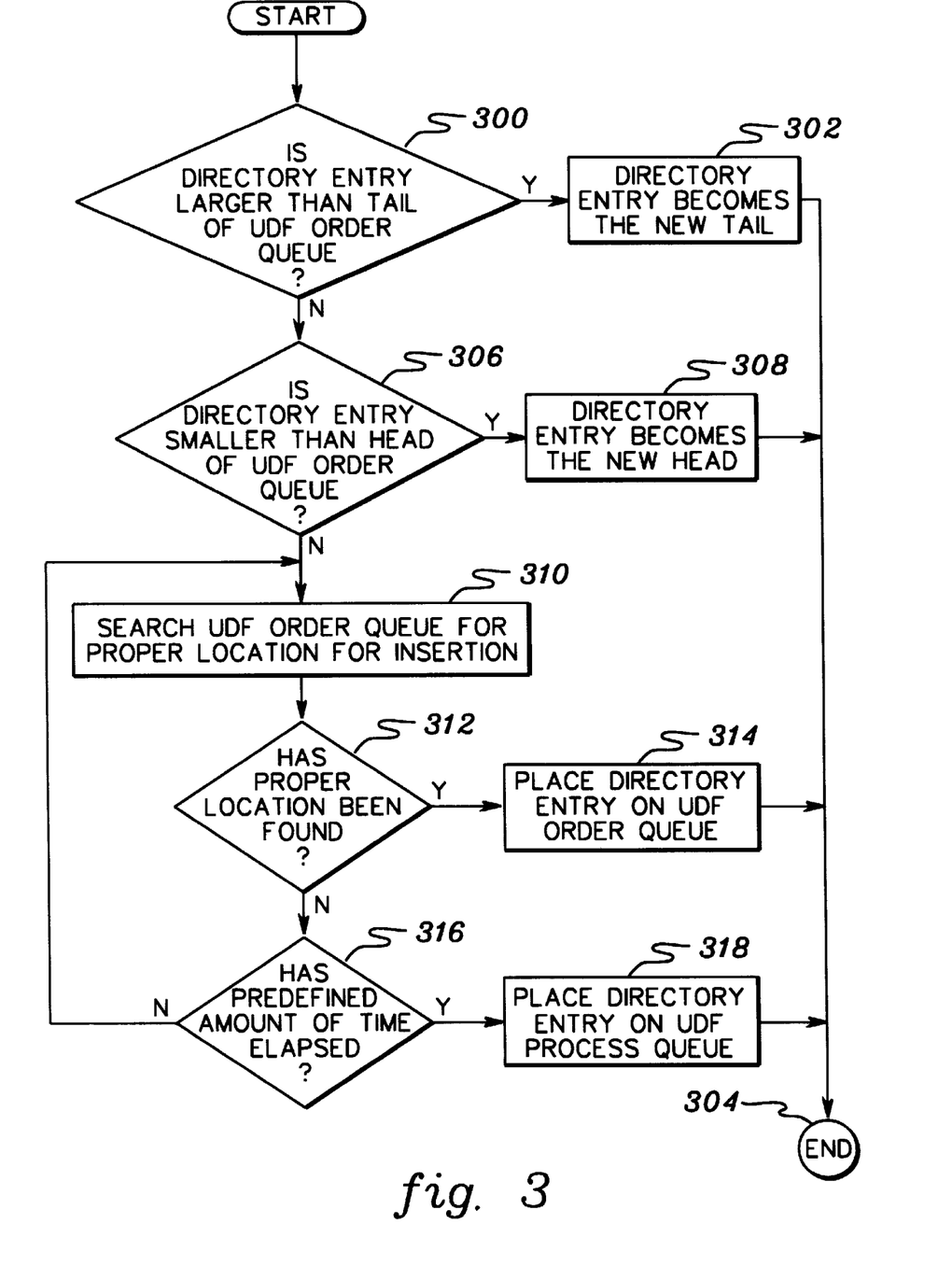
FIG. 3 depicts one embodiment of the logic associated with attempting to insert an entry on the ordered data structure of FIG. 2a, in accordance with the principles of the present invention.

Referring to FIG. 3, when a new directory entry is added to a castout class, indicating the entry is associated with changed data, an attempt is made to appropriately place the entry on the UDF order queue corresponding to that castout class. In one embodiment, this attempt includes making a determination as to whether the directory entry to be inserted on the queue is larger than the tail of the UDF order queue, INQUIRY 300. In particular, the UDF timestamp of the directory entry to be inserted is compared to the UDF timestamp within the directory entry at the tail of the UDF order queue. If the timestamp of the directory entry to be inserted is larger than the timestamp at the tail of the UDF order queue, then the directory entry becomes the new tail, STEP 302, and the procedure to place the entry on the UDF queue is complete, STEP 304.

Consider an example. Assume the entry to be inserted includes a timestamp of 0800 hours (using a 24 hour clock) and the entry at the tail has a timestamp of 0500 hours of the same day, then the entry to be inserted is considered larger than the tail and it becomes the new tail. Similarly, take an example of where an entry to be inserted includes a timestamp of 8:00 pm and the entry at the tail has a timestamp of 8:00 am of the same day, then again the new entry is considered larger than the tail and it becomes the new tail.

Returning to INQUIRY 300, if the timestamp of the directory entry to be inserted is not larger than the tail of the UDF order queue, then a further determination is made as to whether the directory entry to be inserted is smaller than the head of the UDF order queue, INQUIRY 306. For instance, the timestamp of the directory entry to be inserted is compared to the timestamp of the directory entry at the head of the UDF order queue. If the timestamp of the directory entry to be inserted is smaller than the timestamp at the head, then the directory entry becomes the new head, STEP 308, and insert processing is complete, STEP 304.

If, however, the directory entry is not larger than the tail of the UDF order queue or smaller than the head of the UDF order queue, then a search of the UDF order queue begins to locate the proper location to insert the directory entry, STEP 310. In one example, the search begins at the tail and travels towards the head. At each location, a determination is made as to whether the proper location has been found, INQUIRY 312. For example, the timestamp of the directory entry to be inserted is compared to the timestamp of the directory entry at that location. Should the timestamp of the entry to be added be larger than the timestamp of the entry at that location, the directory entry is added to the right of that location, STEP 314.

However, if the proper location has not been found, then a further determination is made as to whether a predefined amount of time has elapsed, INQUIRY 316. For example, a determination is made as to whether a search of a predefined number of entries (e.g., 100–200 entries) has occurred. If the predefined amount of time has not elapsed, then the search continues for the proper location, STEP 310. However, if the proper location has not been found and the predefined amount of time has elapsed, then the directory entry is placed on the UDF process queue, as described below, STEP 318.

Figure 4:
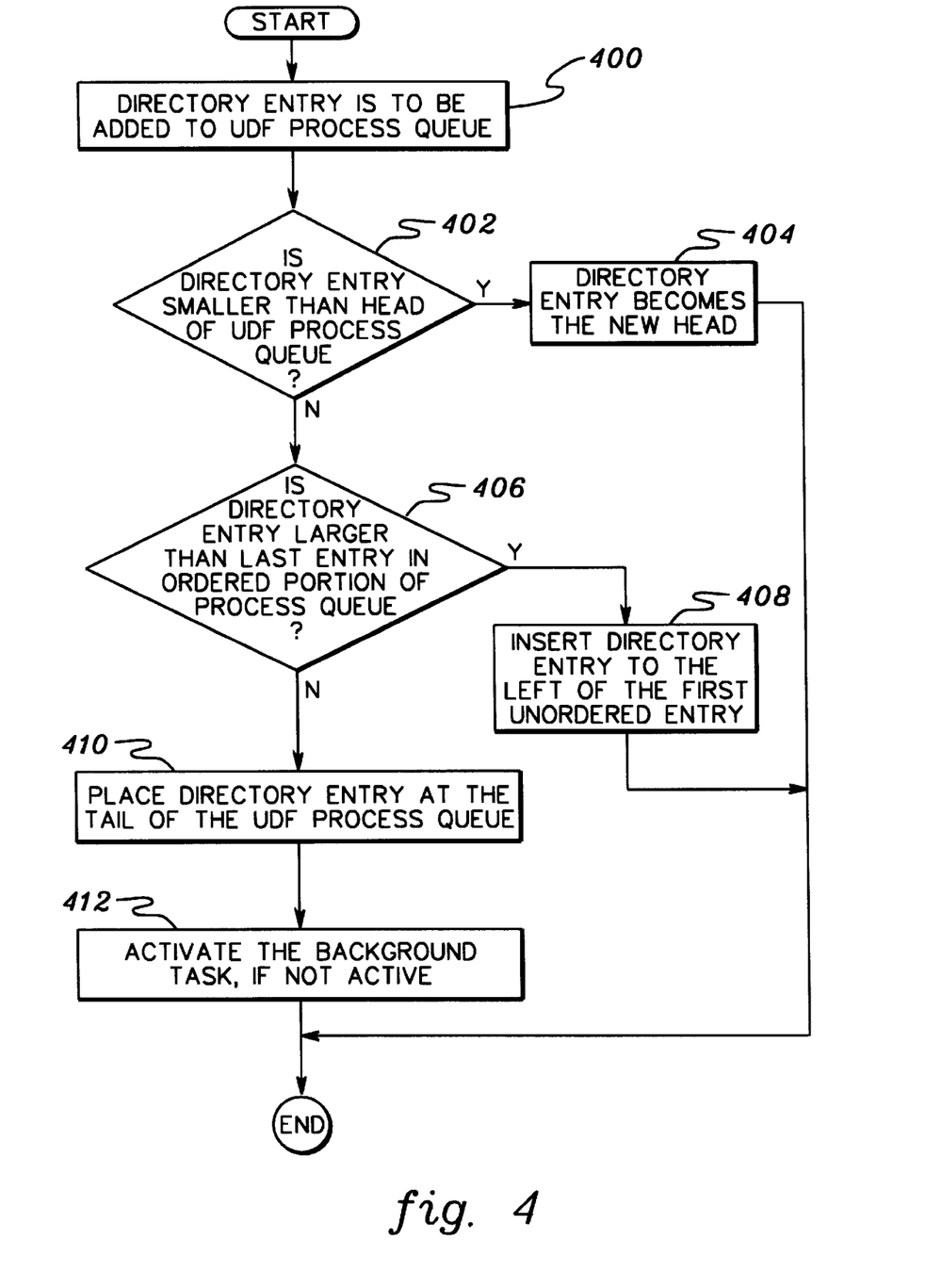
FIG. 4 depicts one embodiment of the logic associated with inserting an entry on the data structure of FIG. 2b, in accordance with the principles of the present invention.

One example of placing a directory entry on the UDF process queue is described with reference to FIG. 4. When a directory entry is to be added to the UDF process queue, STEP 400, a determination is made as to whether the timestamp of the directory entry to be added is smaller than the timestamp at the head of the UDF process queue, STEP 402. If the timestamp of the directory entry is smaller than the timestamp at the head of the UDF process queue, then the directory entry becomes the new head, STEP 404, and processing is complete.

However, if the timestamp of the directory entry is not smaller than the timestamp at the head of the process queue, then a further determination is made as to whether the timestamp of the directory entry to be added is larger than the timestamp of the last entry in the ordered portion of the process queue, STEP 406. Should the timestamp of the directory entry to be inserted be larger than the timestamp of the last entry of the ordered portion of the process queue, then the directory entry is inserted to the left of the first unordered entry, STEP 408. On the other hand, if the timestamp of the directory entry to be added is not larger than the timestamp of the last entry in the ordered portion of the process queue, then the directory entry is placed at the tail of the UDF process queue, STEP 410. That is, the directory entry is placed in the unordered portion of the UDF process queue.

Additionally, a background task used to order the UDF process queue is activated, if it is not already active. The background task is, for example, a part of changed data management facility 126, and typically runs when the coupling facility is not busy with other work, STEP 412.

As described above, the UDF process queue is used when the proper location to insert a new directory entry cannot be located on the UDF order queue within a predefined amount of time. This enables the directory entry to be added to the UDF queues without adding undue delay to the write command and still allowing an efficient determination of the oldest entry in the UDF queues.

Figure 5:
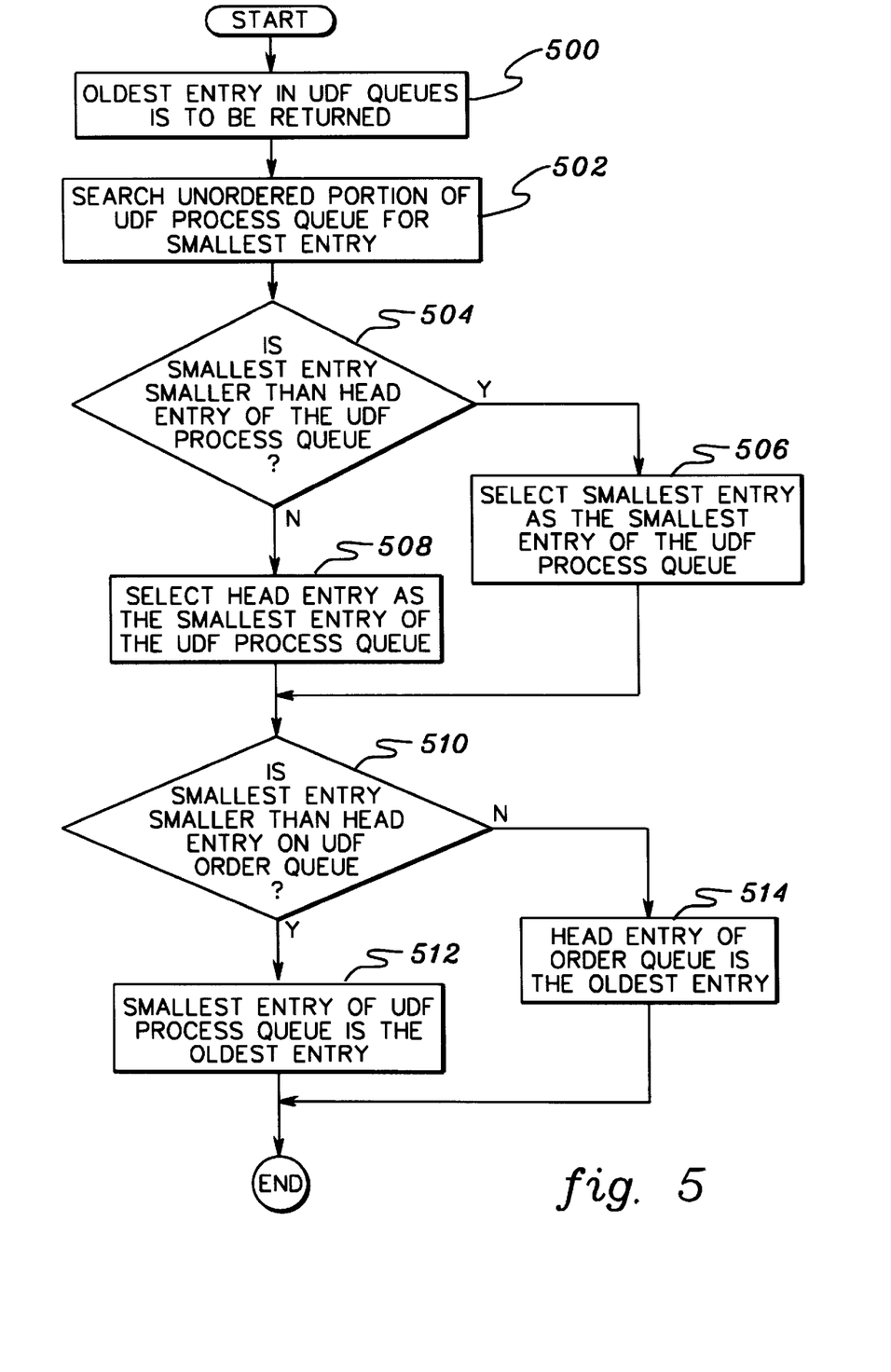
FIG. 5 depicts one embodiment of the logic used to retrieve the oldest entry of the data structures of FIGS. 2a and 2b, in accordance with the principles of the present invention.

One embodiment for determining the oldest entry in the UDF queues for a castout class is described with reference to FIG. 5. The logic of FIG. 5 is implemented, for instance, by changed data management facility 126, which is invoked by commands of database management facility 109. Referring to FIG. 5, when the oldest entry in the UDF queues is to be returned, STEP 500, a determination is made as to the smallest entry in the UDF process queue. If the UDF process queue is empty, this determination is made quickly. However, assuming the process queue is not empty, a search is performed of the queue.

The search of the process queue begins with the unordered portion of the queue, STEP 502. If there are no entries in the unordered portion (as indicated by a null unordered pointer), then this determination is quickly made. However, assuming that the unordered portion of the queue is not null, a search is performed of the unordered portion of the UDF process queue looking for the smallest entry (i.e., the entry with the smallest timestamp).

When that entry is found, it is compared to the head entry of the UDF process queue. In particular, a determination is made as to whether the timestamp of the smallest entry in the unordered portion of the UDF process queue is smaller than the timestamp at the head of the UDF process queue, INQUIRY 504. If the timestamp of the smallest entry is smaller than the head, then the smallest entry of the unordered portion is considered the smallest entry of the UDF process queue, STEP 506. On the other hand, if the timestamp of the head entry is smaller than the timestamp of the smallest entry of the unordered portion, then the head entry is selected as the smallest entry of the UDF process queue, STEP 508.

Thereafter, a determination is made as to whether the timestamp of the smallest entry of the UDF process queue is smaller than the timestamp of the head entry on the UDF order queue, INQUIRY 510. If the timestamp of the smallest entry of the process queue is smaller than the timestamp of the head of the order queue, then the smallest entry of the UDF process queue is considered the oldest entry, STEP 512. However, if the timestamp of the smallest entry of the UDF process queue is not smaller than the timestamp of the head entry on the UDF order queue, then the head entry of the UDF order queue is considered the oldest entry, STEP 514. This completes the determination of the oldest cached data of a castout class.

The above determination of the oldest entry on the UDF queues occurs, for instance, when castout processing is executed by the database management facility. The castout processing causes a header associated with the castout class to be read and included within the header, in accordance with the present invention, is the oldest entry of the class. Further aspects of castout processing are described in U.S. Pat. No. 5,493,668, Elko et al., entitled "Multiple Processor System Having Software For Selecting Shared Cache Entries Of An Associated Castout Class For Transfer To A DASD With One I/O Operation," issued on Feb. 20, 1996 to International Business Machines Corporation, Armonk, N.Y.; U.S. Pat. No. 5,457,793, Elko et al., entitled "Software Cache Management Of A Shared Electronic Store In Supplex," issued on Oct. 10, 1995 to International Business Machines Corporation, Armonk, N.Y.; and U.S. Pat. No. 5,537,574, Elko et al., entitled "Sysplex Shared Data Coherency Method," issued on Jul. 16, 1996 to International Business Machines Corporation, Armonk, N.Y., each of which is hereby incorporated herein by reference in its entirety.

Also, as described above, the top most UDF (i.e., the oldest UDF value) might be immediately available if the UDF queues are entirely ordered, i.e., the UDF process queue is empty. Alternatively, the top most UDF may need to be determined by the previous procedure. Therefore, it is advantageous to attempt to keep the unordered portion of the UDF process queue small, so that the top most UDF can be determined quickly. This is accomplished by the background task running in the coupling facility.

One embodiment of the background task used to order the unordered portion of the UDF process queue is described with reference to FIG. 6. The logic of FIG. 6 is implemented by, for instance, changed data management facility 126, which is invoked by commands of database management facility 109.

Figure 6:
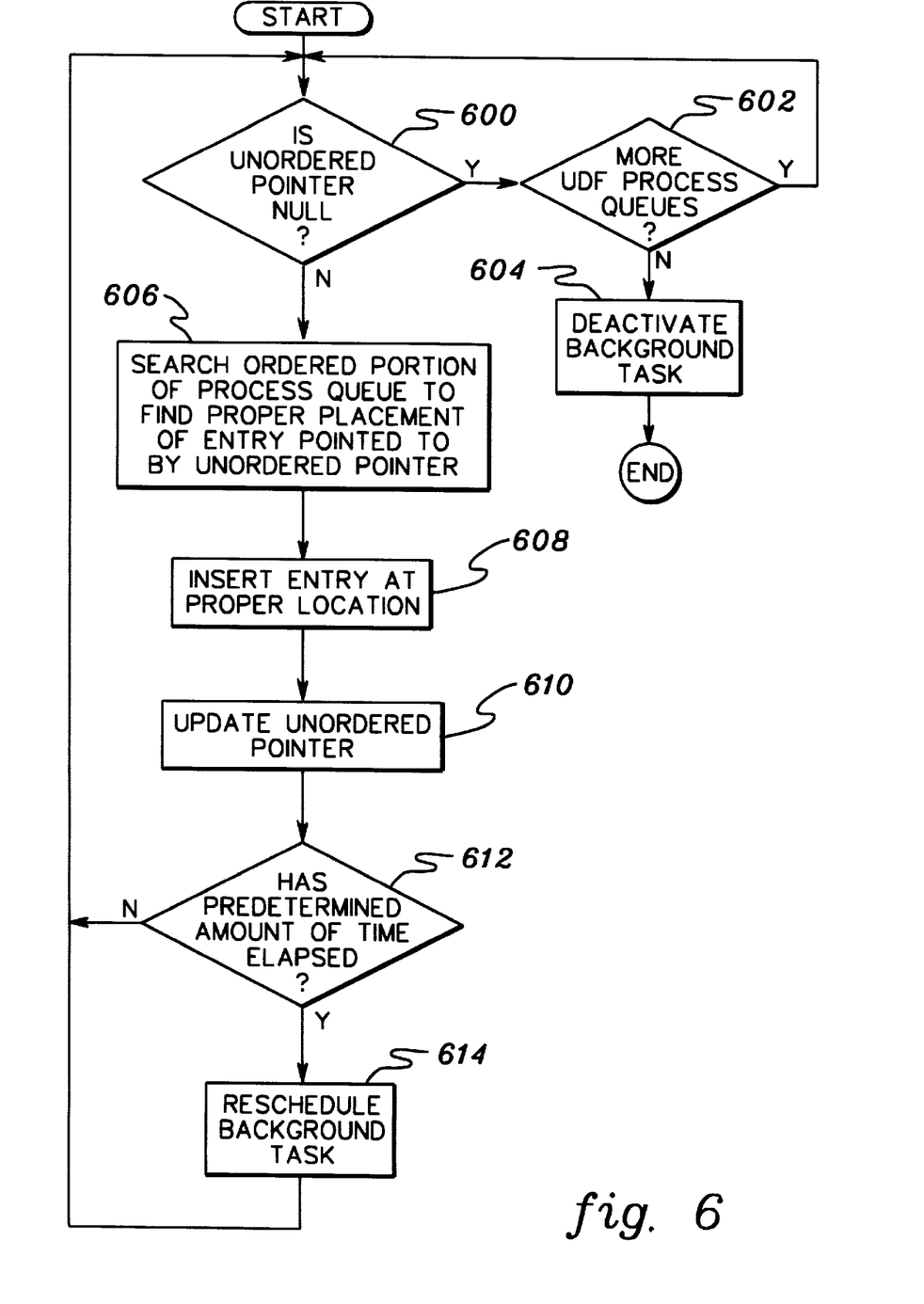
FIG. 6 depicts one embodiment of the logic used to order the data structure of FIG. 2b, in accordance with the principles of the present invention.

Referring to FIG. 6, when the background task is activated, it continually checks each castout class process queue to see if it is completely ordered. For example, the background task starts by checking the unordered pointer of one of the UDF process queues. If the unordered pointer of that queue is null, then a determination is made as to whether other UDF process queues are to be checked, INQUIRY 602. Should there be another UDF process queue to be checked, then processing returns to INQUIRY 600 "IS UNORDERED POINTER NULL?" and the pointer of that next queue is checked. However, when all of the UDF process queues have been checked, and they all are in order, then the background task is deactivated, STEP 604.

Returning to INQUIRY 600, if the unordered pointer of a process queue is not null, then the background task searches the ordered portion of the process queue to find the proper placement of the entry pointed to by the unordered pointer, STEP 606. When the proper location is found, the entry is inserted into the location, STEP 608. Then, the unordered pointer is updated to point to the next unordered entry of that queue, STEP 610.

During each invocation of the background task, the background task executes for a relatively short fixed time slice. During that time, however, the task orders at least one entry or determines that the UDF process queue is ordered. Since the task executes for a fixed amount of time, during the processing, a determination is made as to whether the predetermined amount of time has elapsed, INQUIRY 612. If not, then processing continues with STEP 600.

However, if the predetermined amount of time for the background task has elapsed, INQUIRY 612, then the background task automatically reschedules itself, STEP 614. The above process then continues until the background task determines that all of the UDF process queues are in order.

In one embodiment of the present invention, the cache users can determine whether or not UDF order queues are to be used. If the cache users have not configured the cache in store-in mode, the overhead associated with the UDF order queues can be avoided by using a selectable cache attribute, called the UDF order queue indicator. When the cache structure is created and the UDF order queue indicator is set to request UDF order queues, the UDF order queues are created for each of the castout classes and are managed by the processes described above. If, however, the UDF order queue indicator is not set, no UDF order queues are created.

Described above is a capability for managing changed data of castout classes. Directory entries associated with the changed data are placed on UDF queues in an efficient manner, so that the oldest changed data of each castout class can be determined quickly and efficiently. The UDF order queue is viewed as a single thread of ordered directory entries for each castout class. The insertion of new directory entries into the UDF order queue occurs when the data is written. Since writes are occurring during transaction processing, the present invention advantageously avoids adding undue delay to the write command by limiting the searching of the queue for the proper insertion point. Instead, the present invention utilizes a process queue. Further, background tasks executed in the coupling facility are used to complete the ordering of entries on the UDF process queue. This is accomplished while maintaining the architected view of a single order queue.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing changed data of castout classes, said method comprising:

attempting to place, within a predefined amount of time, an entry for a changed datum in a first data structure associated with a castout class; and placing said entry in a second data structure associated with said castout class, when the predefined amount of time to place said entry in said first data structure elapses.

2. The method of claim 1, wherein said attempting comprises:

determining whether a timestamp of said entry is larger than a timestamp located at one end of said first data structure;

determining, when said timestamp of said entry is not larger, whether said timestamp of said entry is smaller than a timestamp located at another end of said first data structure; and searching said first data structure for said predefined amount of time, when said timestamp of said entry is not larger than the timestamp at the one end or smaller than the timestamp at the another end, for a proper location to place said entry.

3. The method of claim 2, wherein said one end is a tail of said first data structure, and wherein said entry becomes a new tail of said first data structure, when said timestamp of said entry is larger than the timestamp at said tail.

4. The method of claim 2, wherein said another end is a head of said first data structure, and wherein said entry becomes a new head of said first data structure, when said timestamp of said entry is smaller than the timestamp at said head.

5. The method of claim 1, wherein said placing comprises:

inserting said entry at one end of a first portion of said second data structure, when a timestamp of said entry is smaller than a timestamp located at said one end;

inserting said entry at another end of said first portion of said second data structure, when said timestamp of said entry is larger than a timestamp located at said another end; and inserting said entry in a second portion of said second data structure, when said entry is not inserted at said one end or said another end.

6. The method of claim 5, wherein said inserting said entry in said second portion comprises inserting said entry at one end of said second portion.

7. The method of claim 1, wherein said first data structure comprises a plurality of entries and said second data structure comprises one or more entries, and wherein said method further comprises determining which entry of said first data structure or said second data structure represents an oldest changed datum of said castout class.

8. The method of claim 7, wherein said determining comprises:

ascertaining a smallest timestamp of said second data structure; and comparing said smallest timestamp of said second data structure with a smallest timestamp of said first data structure, wherein said oldest changed datum corresponds to a smaller of said smallest timestamp of said second data structure and said smallest timestamp of said first data structure.

9. The method of claim 8, wherein said ascertaining comprises:

determining a smallest timestamp of one portion of said second data structure; and comparing said smallest timestamp of said one portion with a timestamp located at one end of another portion of said second data structure, wherein said smallest timestamp of said second data structure is a smaller of said smallest timestamp of said one portion and said timestamp of said one end of said another portion.

10. The method of claim 9, wherein said one portion of said second data structure is unordered and said another portion of said second data structure is ordered by timestamps.

11. The method of claim 1, wherein at least a portion of said second data structure is unordered, and wherein said method further comprises ordering, using at least one background task, said at least a portion of said second data structure.

12. The method of claim 1, wherein said first data structure is ordered by timestamps, and said second data structure includes a first portion ordered by timestamps and a second unordered portion.

13. The method of claim 12, further comprising ordering said second data structure, when it is determined that said second portion of said second data structure includes one or more entries.

14. The method of claim 13, wherein said ordering comprises inserting said one or more entries into one or more proper locations within said first portion of said second data structure.

15. The method of claim 14, wherein said inserting is performed by at least one background task executing within a computing environment.

16. The method of claim 1, wherein said first data structure and said second data structure are maintained by a coupling facility shareable between one or more processors of a computing environment.

17. The method of claim 1, wherein said first data structure and said second data structure are architected as one data structure.

18. The method of claim 1, wherein said attempting comprises:

determining whether a timestamp of said entry is older than a timestamp located at one end of said first data structure;

determining, when said timestamp of said entry is not older, whether said timestamp of said entry is earlier than a timestamp located at another end of said first data structure; and searching said first data structure for said predefined amount of time, when said timestamp of said entry is not older than the timestamp at the one end or earlier than the timestamp at the another end, for a proper location to place said entry.

19. The method of claim 1, wherein said placing comprises:

inserting said entry at one end of a first portion of said second data structure, when a timestamp of said entry is earlier than a timestamp located at said one end;

inserting said entry at another end of said first portion of said second data structure, when said timestamp of said entry is older than a timestamp located at said another end; and inserting said entry in a second portion of said second data structure, when said entry is not inserted at said one end or said another end.

20. A system of managing changed data of castout classes, said system comprising:

means for attempting to place, within a predefined amount of time, an entry for a changed datum in a first data structure associated with a castout class; and means for placing said entry in a second data structure associated with said castout class, when the predefined amount of time to place said entry in said first data structure elapses.

21. The system of claim 20, wherein said means for attempting comprises:

means for determining whether a timestamp of said entry is larger than a timestamp located at one end of said first data structure;

means for determining, when said timestamp of said entry is not larger, whether said timestamp of said entry is smaller than a timestamp located at another end of said first data structure; and means for searching said first data structure for said predefined amount of time, when said timestamp of said entry is not larger than the timestamp at the one end or smaller than the timestamp at the another end, for a proper location to place said entry.

22. The system of claim 21, wherein said one end is a tail of said first data structure, and wherein said entry becomes a new tail of said first data structure, when said timestamp of said entry is larger than the timestamp at said tail.

23. The system of claim 21, wherein said another end is a head of said first data structure, and wherein said entry becomes a new head of said first data structure, when said timestamp of said entry is smaller than the timestamp at said head.

24. The system of claim 20, wherein said means for placing comprises:

means for inserting said entry at one end of a first portion of said second data structure, when a timestamp of said entry is smaller than a timestamp located at said one end;

means for inserting said entry at another end of said first portion of said second data structure, when said timestamp of said entry is larger than a timestamp located at said another end; and means for inserting said entry in a second portion of said second data structure, when said entry is not inserted at said one end or said another end.

25. The system of claim 24, wherein said means for inserting said entry in said second portion comprises inserting said entry at one end of said second portion.

26. The system of claim 20, wherein said first data structure comprises a plurality of entries and said second data structure comprises one or more entries, and wherein said system further comprises means for determining which entry of said first data structure or said second data structure represents an oldest changed datum of said castout class.

27. The system of claim 26, wherein said means for determining comprises:

means for ascertaining a smallest timestamp of said second data structure; and means for comparing said smallest timestamp of said second data structure with a smallest timestamp of said first data structure, wherein said oldest changed datum corresponds to a smaller of said smallest timestamp of said second data structure and said smallest timestamp of said first data structure.

28. The system of claim 27, wherein said means for ascertaining comprises:

means for determining a smallest timestamp of one portion of said second data structure; and means for comparing said smallest timestamp of said one portion with a timestamp located at one end of another portion of said second data structure, wherein said smallest timestamp of said second data structure is a smaller of said smallest timestamp of said one portion and said timestamp of said one end of said another portion.

29. The system of claim 20, wherein at least a portion of said second data structure is unordered, and wherein said system further comprises at least one background task, used to order said at least a portion of said second data structure.

30. The system of claim 20, wherein said first data structure is ordered by timestamps, and said second data structure includes a first portion ordered by timestamps and a second unordered portion.

31. The system of claim 30, further comprising means for ordering said second data structure, when it is determined that said second portion of said second data structure includes one or more entries.

32. The system of claim 31, wherein said means for ordering comprises inserting said one or more entries into one or more proper locations within said first portion of said second data structure.

33. The system of claim 20, wherein said means for attempting comprises:

means for determining whether a timestamp of said entry is older than a timestamp located at one end of said first data structure;

means for determining, when said timestamp of said entry is not older, whether said timestamp of said entry is earlier than a timestamp located at another end of said first data structure; and means for searching said first data structure for said predefined amount of time, when said timestamp of said entry is not older than the timestamp at the one end or earlier than the timestamp at the another end, for a proper location to place said entry.

34. The system of claim 20, wherein said means for placing comprises:

means for inserting said entry at one end of a first portion of said second data structure, when a timestamp of said entry is earlier than a timestamp located at said one end;

means for inserting said entry at another end of said first portion of said second data structure, when said timestamp of said entry is older than a timestamp located at said another end; and means for inserting said entry in a second portion of said second data structure, when said entry is not inserted at said one end or said another end.

35. A system of managing changed data of castout classes, said system comprising:

a processor adapted to place, within a predefined amount of time, an entry for a changed datum in a first data structure associated with a castout class; and said processor being further adapted to place said entry in a second data structure associated with said castout class, when the predefined amount of time to place said entry in said first data structure elapses.

36. An article of manufacture, comprising:

at least one computer usable medium having computer readable program code means embodied therein for causing the managing of changed data of castout classes, the computer readable program code means in said article of manufacture comprising:

computer readable program code means for causing a computer to attempt to place, within a predefined amount of time, an entry for a changed datum in a first data structure associated with a castout class; and computer readable program code means for causing a computer to place said entry in a second data structure associated with said castout class, when the predefined amount of time to place said entry in said first data structure elapses.

37. The article of manufacture of claim 36, wherein said computer readable program code means for causing a computer to attempt comprises:

computer readable program code means for causing a computer to determine whether a timestamp of said entry is larger than a timestamp located at one end of said first data structure;

computer readable program code means for causing a computer to determine, when said timestamp of said entry is not larger, whether said timestamp of said entry is smaller than a timestamp located at another end of said first data structure; and computer readable program code means for causing a computer to search said first data structure for said predefined amount of time, when said timestamp of said entry is not larger than the timestamp at the one end or smaller than the timestamp at the another end, for a proper location to place said entry.

38. The article of manufacture of claim 36, wherein said computer readable program code means for causing a computer to place comprises:

computer readable program code means for causing a computer to insert said entry at one end of a first portion of said second data structure, when a timestamp of said entry is smaller than a timestamp located at said one end;

computer readable program code means for causing a computer to insert said entry at another end of said first portion of said second data structure, when said timestamp of said entry is larger than a timestamp located at said another end; and computer readable program code means for causing a computer to insert said entry in a second portion of said second data structure, when said entry is not inserted at said one end or said another end.

39. The article of manufacture of claim 36, wherein said first data structure comprises a plurality of entries and said second data structure comprises one or more entries, and wherein said article of manufacture further comprises computer readable program code means for causing a computer to determine which entry of said first data structure or said second data structure represents an oldest changed datum of said castout class.

40. The article of manufacture of claim 39, wherein said computer readable program code means for causing a computer to determine comprises:

computer readable program code means for causing a computer to ascertain a smallest timestamp of said second data structure; and computer readable program code means for causing a computer to compare said smallest timestamp of said second data structure with a smallest timestamp of said first data structure, wherein said oldest changed datum corresponds to a smaller of said smallest timestamp of said second data structure and said smallest timestamp of said first data structure.

41. The article of manufacture of claim 36, wherein at least a portion of said second data structure is unordered, and wherein said article of manufacture further comprises computer readable program code means for causing a computer to order, using at least one background task, said at least a portion of said second data structure.

42. The article of manufacture of claim 36, wherein said first data structure is ordered by timestamps, and said second data structure includes a first portion ordered by timestamps and a second unordered portion.

43. The article of manufacture of claim 42, further comprising computer readable program code means for causing a computer to order said second data structure, when it is determined that said second portion of said second data structure includes one or more entries.

* * * * *